United States Patent [19]
Eyuboglu et al.

[11] Patent Number: 5,818,879
[45] Date of Patent: Oct. 6, 1998

[54] DEVICE, SYSTEM AND METHOD FOR SPECTRALLY SHAPING TRANSMITTED DATA SIGNALS

[75] Inventors: M. Vedat Eyuboglu, Concord, Mass.; Pierre A. Humblet, Cannes, France

[73] Assignee: Motorola Inc., Schaumburg, Ill.

[21] Appl. No.: 747,840

[22] Filed: Nov. 13, 1996

Related U.S. Application Data

[63] Continuation-in-part of Ser. No. 730,434, Oct. 15, 1996.

[51] Int. Cl.$^6$ .................................................. H04L 25/49
[52] U.S. Cl. ........................................ 375/286; 345/295
[58] Field of Search .................................. 375/216, 222, 375/242, 286, 290, 295; 379/93.01

[56] References Cited

U.S. PATENT DOCUMENTS

| | | | |
|---|---|---|---|
| 5,040,191 | 8/1991 | Forney, Jr. et al. | 375/261 |
| 5,394,437 | 2/1995 | Ayanoglu et al. | 375/222 |
| 5,528,625 | 6/1996 | Ayanoglu et al. | 375/222 |
| 5,659,579 | 8/1997 | Herzberg | 375/286 |

OTHER PUBLICATIONS

Rockwell International, 56 Kbps Communications Across the PSTN, 1996, Internet URL, http://www/.nb.rockwell.com/nr/modemsys/.

Kalet, I.; Mazo, J.E.; Saltzberg, B.R.; The Capacity of PCM Voiceband Channels, 1993, IEEE 0–7803–0950–Feb. 1993, pp. 507–511.

Forney, G.D. Jr.; Calderbank, A.R.; Coset Codes for Partial Response Channels; or, Coset Codes with Spectral Nulls, Sep. 1989, IEEE Trans. Information Theory, vol. IT–35, pp. 925–943.

Calderbank, A.R.; Lee, T.A.; Mazo, J.E.; Baseband Trellis Codes with a Spectral Null at Zero, IEEE Trans. Information Theory, vol. IT–34, pp. 425–434, 1988.

Calderbank, A.R.; Mazo, J.E.; Baseband line codes via spectral factorization, IEEE J. Select. Areas Commun., vol. SAC–7, pp. 914–928, 1989.

Forney, G.D. Jr.; Eyuboglu, M.V.; Combined Equalization and Coding Using Precoding, IEEE Communications Magazine, vol. 29, No. 12, pp. 25–34, Dec. 1991.

Eyuboglu, M.V.; Forney, G.D. Jr.; Trellis Precoding: Combined Coding, Precoding and Shaping for Intersymbol Interference Channels, IEEE Trans. Information Theory, vol. 38, pp. 301–314, Mar. 1992.

*Primary Examiner*—Temesghen Ghebretinsae
*Attorney, Agent, or Firm*—John W. Powell

[57] ABSTRACT

A transmitter for transmitting a sequence of octets over a digital network which digital network converts the octets into a sequence of levels for transmission over an analog channel to a receiver, the levels producing an analog signal having a predefined spectral shape, the transmitter including: a mapping device which receives at its input groups of data bits to be transmitted and outputs for each group an equivalence class of one or more levels, wherein at least one equivalence class contains more than one level; a level selector, operably coupled to the mapping device, for selecting the level in the equivalence class to represent the group of data bits to be transmitted; a filter device, operably coupled to the level selector and having a filter response corresponding to the predefined spectral shape, which receives at its input previously selected levels and provides its output to the level selector, wherein the level selector selects the level to be transmitted based on the output of the filter device; and an octet converter, operably coupled to the level selector, which receives the selected level at its input and transmits over the digital network an octet corresponding to the selected level to produce the analog signal having the predefined spectral shape when the transmitted octets are converted to levels in the digital network.

31 Claims, 2 Drawing Sheets

DEVICE, SYSTEM AND METHOD FOR SPECTRALLY SHAPING TRANSMITTED DATA SIGNALS

RELATED APPLICATIONS

This application is a continuation-in-part of U.S. application Ser. No. 08/730,434, filed Oct. 15, 1996, which is hereby incorporated by reference in its entirety.

FIELD OF INVENTION

This invention relates to high speed data communications on a Public Switched Telephone Network (PSTN) and more particularly to a system and method which spectrally shapes the analog data signals transmitted from a telephone central office on the PSTN to remote user over an analog loop.

BACKGROUND OF INVENTION

The PSTN consists of a digital backbone network and analog local loops that connect users to this backbone. In a typical telephone call, the analog signal sent by the local user is digitized at the local central office and converted into a 64 kbit/s bitstream which is carried across the digital backbone network and then converted back to analog at the remote central office for delivery to the remote user over the remote local loop. Dial-up modems communicate over the PSTN by modulating the digital information into an analog signal for transmission. The digital-to-analog conversion process at the entry point to the digital backbone introduces quantization noise which limits the data transmission speed to around 30 kbit/s.

ISDN is a circuit-switched public network which allows end-to-end digital communication using 64 kbit/s circuits. When an ISDN user communicates with a PSTN user, the analog information generated at the ISDN site is converted into a 64 kbit/s bitstream in an ISDN terminal adapter, in the same manner the central office digitizes an analog signal that originates at a PSTN site. Besides ISDN, a PSTN end-point can also be reached using other forms of digital access. For example, medium-to-large size corporations often use T1 lines to access the PSTN. Regardless of the digital access medium, the traditional method of converting the modem signal into a 64 kbit/s bitstream limits the achievable modem speed to around 30 kbit/s.

There is therefore a need for a system and method of communication between users having a digital connection to the telephone network and users connected to the network by an analog loop at higher transmission rates while avoiding the requirement of specialized and expensive infrastructure.

DETAILED DESCRIPTION OF A PREFERRED EMBODIMENT

Figure 1:
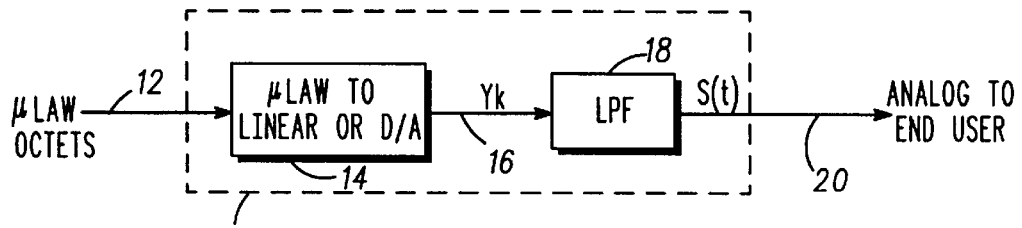
FIG. 1 is a simplified block diagram of a typical telephone company central office.

A technique that allows transmission at speeds significantly higher than 30 kbit/s, when one user has a direct connection to a digital network, for example, via ISDN or T1 has been developed and is described in application Ser. No. 08/720,992 entitled Device, System and Method for Adaptive Self-Noise Cancellation for Decision Directed Timing Recovery, filed Oct. 15, 1996, U.S. application Ser. No. 08/720,988 (Attorney Docket No. CX096045); System and Device for, and Method of, Processing Baseband Signals to Combat ISI and Non-linearities in a Communication System, filed Oct. 15, 1996, U.S. Apl. Ser. No. pending (Attorney Docket No. CX096046);

and System and Device for, and Method of, Detecting, Characterizing and Mitigating Deterministic Distortion in a Communications Network, filed Oct. 15, 1996, U.S. application Ser. No. 08/730,433 (Attorney Docket No. CX096047), assigned to the assignee of the instant invention. These co-pending applications are incorporated herein in their entireties by reference. With this technique, random digital information is encoded into $\mu$-law or A-law octets, depending on the region of the world, using a channel encoder and then the octets are mapped directly into levels in the digital-to-analog (D/A) converter located in the remote user's central office. (In what follows, unless indicated otherwise, we will assume the $\mu$-law. The extensions to A-law are straightforward.) The mapping could use all of or any subset of the 255 levels of the D/A converter, subject to regulatory restrictions on average power.

Since information is carried across the digital network in the form of octets, the encoded data is first mapped into $\mu$-law octets for transmission at a rate of 8000 octets per second, and then in the remote user's central office these octets are converted into the desired amplitude levels in the D/A converter. The resulting 8 kHz sequence of levels is then passed through a low pass filter (LPF) and sent over the analog loop to the remote user. The output of the D/A converter can be viewed as a sequence of impulses each having an amplitude corresponding to one of the D/A levels. At the remote end, a receiving modem recovers the original information by first detecting which D/A levels were transmitted, and then inverse mapping these to obtain an estimate of the original digital information. This technique theoretically enables the transmission of data at 64 kbps; however, with actual system constraints and noise, achieving transmission rates of 48 kbps to 56 kpbs is more realistic. These transmission rates are a significant improvement over the once thought theoretical limit of about 32 kbps.

When the transmitted information is random, a spectral analysis of the signals after the D/A conversion reveals that the spectrum of the sequence output by the D/A converter is essentially flat. Therefore, when this sequence is passed through the LPF at the central office, the spectrum of the signal takes on the shape of the spectrum of the LPF. Unfortunately, this spectrum has a significant amount of energy near DC (f=0) which can drive transformers in the system into saturation and introduce unwanted non-linear distortion on the signal being transmitted. In certain applications, e.g. the high rate data transmission technique, this distortion cannot be tolerated and therefore there is a need for its elimination.

More generally there is a need for a scheme that can shape the spectrum of the signal transmitted from the D/A converter. Further, there is a need to combine such spectral shaping with channel coding.

There are known methods in the state-of-the-art for mapping digital data into sequences with a prescribed spectral shape. For example, U.S. Pat. No. 5,040,191, entitled Partial Response Channel Signaling System, describes such a method. However, these methods assume that the transmitted signals are chosen from a signal constellation whose points lie on a translate of a lattice. Since the levels on a D/A converter in a central office are nonuniformly spaced and therefore do not lie on a translate of a lattice, these methods are not directly applicable in this application. Furthermore, with the present invention, the encoding is accomplished in the modem, but the mapping into levels occurs inside the network.

Figure 2:
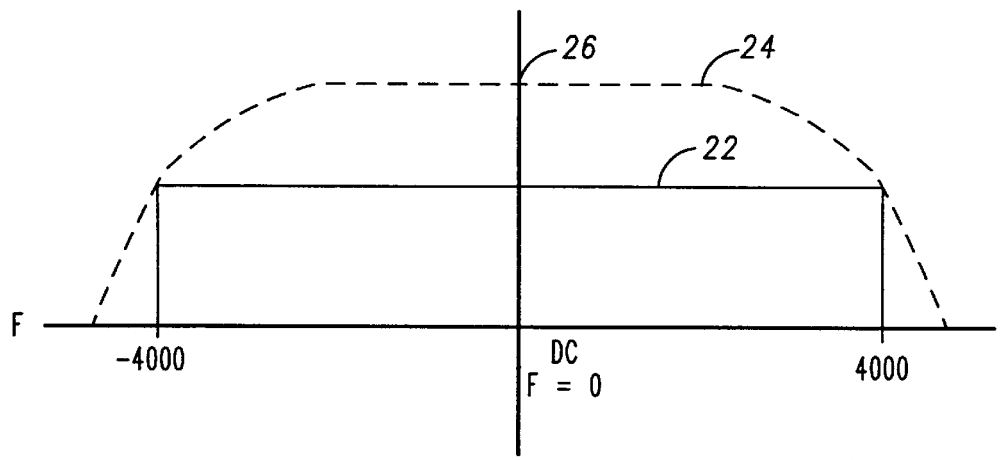
FIG. 2 is plot of the frequency spectrum of the $y_k$ signals output from the $\mu$-law to linear converter of FIG. 1 and the spectral shape of the low pass filter of FIG. 1.

FIGS. 1 and 2 illustrate the presence of energy near DC in the signals transmitted to a remote user's modem over an analog loop. There is shown in FIG. 1 a portion of a typical telephone central office 10 on a PSTN which receives at input 12 $\mu$-law octets transmitted from a modem (transmitting modem, not shown) directly attached to the digital portion of the telephone system, such as the one described in the co-pending applications referred to above which directly encodes the digital data into octets for transmission. These octets are converted by a D/A converter, also known as a $\mu$-law to linear converter 14, to a sequence of voltage levels, $y_k$, each level being one of 255 $\mu$-law levels. The levels are output over line 16 to a LPF 18 which outputs over analog loop 20 towards the remote modem's receiver a filtered analog signal s(t) which is an analog representation of the levels. The analog signal is demodulated and decoded by the receiving modem which outputs a digital bitstream which is an estimate of the originally transmitted data.

The sequence of levels $y_k$ on line 16 from $\mu$-law to linear converter 14 has a flat frequency response 22, FIG. 2. The spectral shape 24 of LPF 18 contains a significant amount of energy near DC (f=0) as illustrated at point 26. Since the sequence $y_k$ has a flat frequency response, the spectrum of the signal s(t) output by filter 18 has the same spectral shape 24 as the filter 18 and therefore the signal s(t) also contains a significant amount of energy near DC. As described above, this energy near DC tends to saturate the transformers on the system which produces unwanted non-linear distortion in the signal s(t) transmitted towards the receiving modem.

Figure 3:
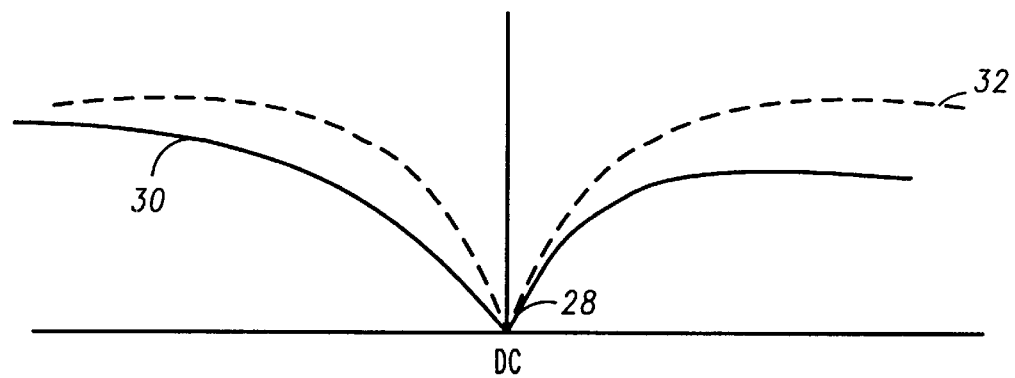
FIG. 3 is a plot of a portion of two frequency spectrums each having a null at DC, wherein one spectrum falls off to zero very abruptly at DC and the other spectrum falls off more gradually.

In some applications this distortion must be reduced. This can be accomplished by reducing the signal energy near DC in the transmitted signal. Such a DC null 28 is depicted in FIG. 3. As is known in the state-of-the-art, in order to create this spectral null at DC in the transmitted signal, the running digital sum (RDS) of the transmitted levels $y_k$ (namely, the algebraic sum of all previously transmitted levels) must be kept close to zero. The shape of the spectrum around the DC null 28 can vary from a relatively shallow sloped spectrum 30 to a spectrum 32 which falls off very abruptly at DC. The sharpness of the null depends on how tightly the RDS is controlled.

The present invention accordingly encodes the digital data being transmitted into $\mu$-law octets in a manner that maintains the RDS near zero to create the desired spectral null at DC thereby reducing the non-linear distortion caused by transformer saturation.

To illustrate the method of creating a spectral null, we consider an example of transmitting 6 bits with every symbol $y_k$. It will be apparent to those skilled in the art that the invention can be used for transmitting any other number of bits per symbol, or when the number of bits per symbol transmitted varies from symbol to symbol. In a system without a spectral null, one first selects a subset of 64 levels from the available 255 $\mu$-law levels such that a minimum distance $d_{min}$ between levels is maintained. These 64 levels are symmetric in the sense that for every positive level there is a negative level of the same magnitude. For example, one can achieve a $d_{min}$ of 32 for an average energy well under $-12$ dBm0, the regulatory limit.

Figure 4:
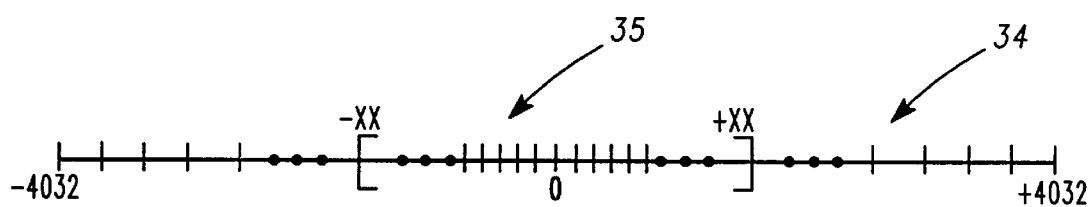
FIG. 4 is a diagrammatic representation of a portion of a typical $\mu$-law constellation.

A partial representation of all 255 $\mu$-law levels 34 (128 positive and 127 negative) is shown in FIG. 4. These levels follow a logarithmic law, with the 64 levels closest to the origin being uniformly spaced between $-63$ and $63$ with a spacing of 2. The next positive and negative segments start at +/-66 and they each contain 16 points spaced by 4. The scale continues with segments of 16 points, each with a spacing of the form $2^n$ separated from the previous segment by a spacing of $0.75*2^n$. The final segments extend between +/-2112 and +/-4032 with a spacing of 128. The set 35 is the set of 64 levels selected from these 255 levels to represent each combination of six bits, i.e. $2^6=64$.

In the transmitter, incoming bits are collected in groups of 6, and then mapped into $\mu$-law octets, which represent the desired level. In the central office, the $\mu$-law octets are converted into levels, and the resulting levels are then transmitted. In the receiver, an equalizer compensates for the distortion introduced by the LPF and the local loop, and then a decision device estimates the transmitted level, by selecting the level that is closest to the received point.

In order to achieve spectral shaping in the above example, additional levels are also used, but the minimum distance between levels is still kept at 32. For example, consider the case where 92 levels are used. First, these 92 levels are divided into equivalence classes. There are a number of different ways for generating these equivalence classes. One particularly useful way is described here: we label the levels by integers 0 through 91, for example by assigning the label 0 to the smallest (most negative) level, the label 1 to the next smallest level, and so on. Then, we define 64 "equivalence classes" by grouping together levels whose labels differ exactly by 64. Such grouping leads to 36 equivalence classes with only one level corresponding to one of 36 innermost levels of smallest magnitude, and 25 equivalence classes with two levels whose labels differ by 64. Other methods for generating the equivalence classes may be used. Each possible combination of 6 bits to be transmitted is then represented by an equivalence class.

For example, the bit combination 000000 may correspond to the first equivalence class which consists of two levels, and each being represented by a different octet. Note that it is not necessary to use the full dynamic range of the D/A converter. The technique can work with any number of levels, as long as more than 64 levels are used. Of course, the more levels used, the better the desired spectral shape can be achieved. Our experiments indicate that very few additional levels need to be considered for generating a DC null with a relatively sharp notch.

In the above example, since each combination of six information bits is represented by an equivalence class and often there is more than one level in an equivalence class, the information bits must be mapped into one of the levels in a selected equivalence class before an octet representing that level is transmitted. This function is described below with regard to FIGS. 5–7.

Figure 5:
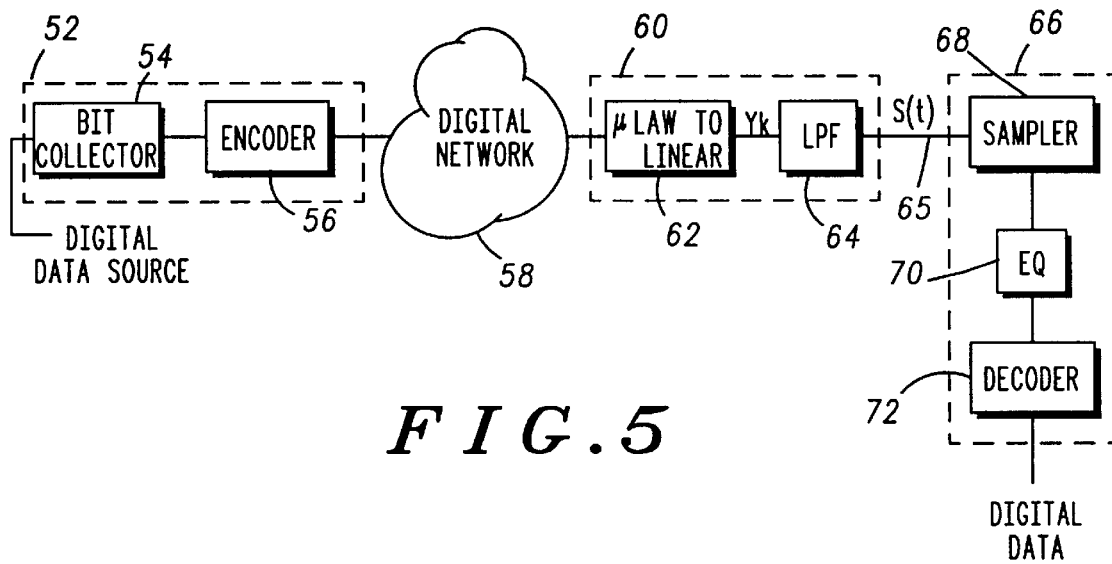
FIG. 5 is a block diagram of a modem data connection over the telephone system including a transmitter for spectrally shaping signals according to this invention.

Transmitter 52, FIG. 5, receives from a digital data source, such as a computer, a bitstream of digital data and with bit collector 54 divides the bits into groups of six, for example. Each six-bit group is provided to encoder 56 which selects the equivalence classes from which the desired levels to achieve the spectral null at DC will be selected. The octets which represent the selected levels are output from encoder 56, transmitted over digital circuit-switched telephone network 58 and arrive at the remote user's central office 60. At central office 60, the octets are converted by $\mu$-law to linear converter 62 to the levels, $y_k$, which pass through LPF 64 and are output over local analog loop 65 as a signal s(t) having a spectral null at DC. In receiver 66, the signal s(t) is sampled by sampler 68, an equalizer 70 compensates for the distortion introduced by LPF 64 and the local loop, and then a decision device or decoder 72 estimates the transmitted level by selecting the level that is closest to the received point. From the level the decoder 72 determines the equivalence class and then recovers the six information bits by performing an inverse mapping function.

The operation of receiver 66 is essentially unchanged as compared to the receiver described in the co-pending applications referred to above. The only difference is that the receiver now needs to consider a larger set of possible levels and the inverse mapping involves the determination of the equivalence class. Equalizer 70 compensates for the linear distortion introduced by the LPF 64 and the local loop 65, as described in the co-pending applications. For example, when a linear equalizer is used, the output of the equalizer can be represented as follows:

$$rk=yk+nk \quad (1)$$

where nk is the total noise plus distortion present at the output of the equalizer. Decoder 72 then selects the levels $y_k$ nearest to rk as the decision, determines its equivalence class, and then recovers the six information bits by an inverse map.

If the equalizer includes a maximum-likelihood sequence estimator (e.g., the Viterbi equalizer), then the received signal can be represented in the form $$rk=\Sigma\ yk-j\ fj+nk, \quad (2)$$

and this time, the decoder selects the closest sequence $\{y_k\}$ using a Viterbi decoder. For each estimated symbol $y_k$, the decoder determines its equivalence class and then finds the six information bits via an inverse map.

Figure 6:
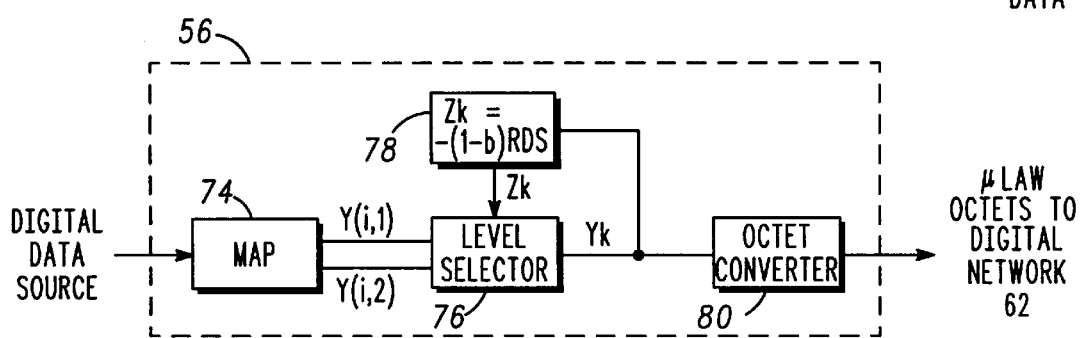
FIG. 6 is a block diagram of the encoder of FIG. 5 used specifically for creating a DC null in said analog signals over an analog loop of the PSTN.

Encoder 56, FIG. 6, includes MAP 74 which is a look-up table containing for each possible combination of the six-bit groups of data received from bit collector 54, FIG. 5, levels representing each equivalence class i, where i is an integer between 0 and 63. Each level, two in this example, y(i,1) and y(i,2) is provided to level selector 76 where a decision is made as to which level, $y_k$, is to be transmitted.

This decision is made as follows. First, encoder 56 keeps track of the running digital sum (RDS) of the transmitted levels, $y_k$, by feeding back the output of level selector 76 to function block 78. From the previously transmitted levels, $y_k$, function block 78 calculates the weighted RDS, $z_k=-(1-b)$RDS, where $0 \leq b < 1$ is weighting factor. Because of D/A nonlinearities, the exact values of the $y_k$ levels may not be known in encoder 56; however, this should not have a significant effect. It is possible to determine the error and send this information back to encoder 56 to make these calculations more accurate.

Given the group of six bits to be transmitted, level selector 76 selects as the level $y_k$ from the equivalence class $\{y(i,1), y(i,2)\}$ the level closest to the weighted RDS. It can be seen that when the RDS is positive, zk will be negative and vice versa. This enables the encoder to choose a level, $y_k$, from each equivalence class such that when its value is added to the RDS it will bring it closer to zero than the other levels in the equivalence class. After selecting the level yk the octet which represents the level $y_k$ is determined by octet converter 80 and transmitted over the digital network. The value of the transmitted octet can be obtained from a look-up table.

The variable b is a weighting factor that controls the trade-off between the sharpness of the spectral null and the average energy of the transmitted signal. Our analysis has shown that when the number of levels is sufficiently larger than the number of equivalence classes, the sequence $y_k$ will have a spectrum which can be approximated by the filter response h(D)=(1–D)/(1–bD). Clearly, when b=0, we find that h(D)=1–D, which is the well-known Class I Partial Response with a sinusoidal spectral shape having a null at DC. On the other hand, as b approaches 1, the spectrum becomes flat across much of the band except for a very sharp spectral null at DC. It can be seen that for b=0, the average energy of $y_k$ will be twice as large as in the case of a flat spectral shape. As b approaches 1, however, the average energy increase will disappear. In some applications, it may be desirable to keep the constellation expansion, measured by the ratio of the number of levels to the number of equivalence classes. It will be apparent to those skilled in the art that the invention can be used with constellations of any number of levels, and with any smaller number of equivalence classes.

The present invention may be more broadly utilized to spectrally shape, as desired, the analog signals output from the $\mu$-law to linear converter at the central office. The example described above is a specific case of using this invention to reduce the energy of the transmitted signal around DC, but the principals of this invention used in that example can be generalized to spectrally shape signals in numerous ways, for example, to pre-equalize the signals.

Figure 7:
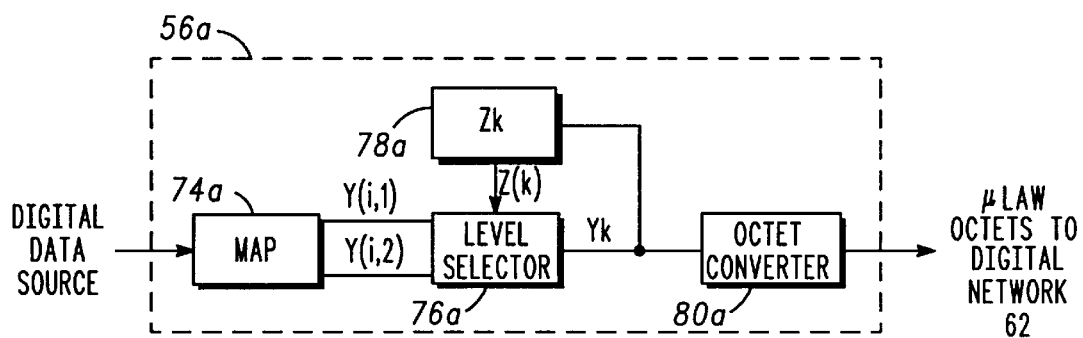
FIG. 7 is a block diagram of the encoder of FIG. 5 which may be used generally for modifying, as desired, the frequency spectrum of the signals output from the analog loop to the end user.

A generic version of the encoder of this invention, encoder 56a, is shown in FIG. 7. The only difference between this general case and the special case of a spectral null described above is how the sequence or spectral function zk is generated. Let h(D) be a monic, causal impulse response of a filter representing the desired spectral shape, where D is a delay operator. Suppose we represent the sequences $\{yk\}$ and $\{zk\}$ using D-transform notation as y(D) and z(D), respectively. Then, the sequence z(D) can be represented as $$z(D)=(1-1/h(D))\ y(D).$$

A close examination of this equation reveals that at a given time k, zk only depends on past values of yk, and therefore can be determined recursively. Thus, for each six bit group, encoder 56a determines which level from the associated equivalence class is nearest in value to $z_k$ and selects that level. The octet representing that level is then transmitted. Again, our analysis shows that for sufficiently large number of levels the sequence $\{y_k\}$ transmitted by the central office 60 will have a spectrum closely approximating the spectrum of the filter with response h(D).

The technique described here can also be used in conjunction with a more complex scheme for mapping the information bits to equivalence classes. For example, it can be used in conjunction with shell mapping, a mapping technique used in the V.34 high-speed modem specification.

The examples described above are for an uncoded system. However, the principals can be easily applied to a coded system, for example a trellis coded system. The only difference in this case is that the equivalence classes are further partitioned into subsets, which are used to construct the trellis code.

For example, when a one-dimensional trellis code based on a 4-way set partition is utilized together with the same 64-level signal constellation to send 5 bits per symbol, the equivalence classes are partitioned into subsets as follows: $a_1, b_1, c_1, d_1, a_2, b_2, c_2, d_2, \ldots a_n, b_n, c_n, d_n$. In the example described above, the 64 equivalence classes would be partitioned into four subsets each containing sixteen equivalence classes. The output of a rate-½ convolutional encoder, e.g. two of the six bits in a group, then determines the subset, and the remaining four "uncoded" bits select the specific equivalence class within the subset. The actual level from the chosen equivalence class in the chosen subset is selected as described above. The operation of the encoder is otherwise unchanged.

Of course, when trellis coding is utilized, the receiver will use a decoder to select the most likely sequence. The trellis decoder may also be an equalizer, jointly decoding the trellis code and equalizing for intersymbol interference.

It may also be possible to use the present invention to enable detection of loss of frame synchronization in a receiver. This can be accomplished by infrequently, but periodically violating the rule for selecting the signal point in a given equivalence class, where the period is chosen to be an integer multiple of the desired framing. A loss of frame synchronization, can be detected in the receiver by monitoring such rule violations. The receiver can also reacquire frame synchronization or may simply request a synchronization pattern (training sequence) from the transmitter.

The present invention may be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transmitter for transmitting a sequence of octets over a digital network which digital network converts the octets into a sequence of levels for transmission over an analog channel to a receiver, the sequence of levels producing an analog signal having a predefined spectral shape, the transmitter comprising:

a mapping device for mapping data bits to be transmitted to a sequence of equivalence classes wherein each equivalence class contains one or more levels, and at least one equivalence class contains more than one level;

a level selector, operably coupled to the mapping device, for selecting a level in each equivalence class to represent the data bits to be transmitted;

a filter device, operably coupled to the level selector and having a predefined filter response, which receives at its input previously selected levels and provides its output to the level selector, wherein the level selector selects the level to be transmitted based on the output of the filter device; and an octet converter, operably coupled to the level selector, which receives the selected level at its input and transmits over the digital network an octet corresponding to the selected level to produce the analog signal having the predefined spectral shape when the transmitted octets are converted to levels in the digital network.

2. The transmitter of claim 1 wherein the levels are nonuniformly spaced.

3. The transmitter of claim 2 wherein the nonuniformly-spaced levels are chosen from the A-law or mu-law specifications.

4. The transmitter of claim 1 wherein the level selector selects the level in the equivalence class which is closest to the output of the filter device.

5. The transmitter of claim 1 wherein the filter device is characterized by the predefined filter response $h(D)=(1-D)/(1-bD)$, where $0<b\leq 1$ is a weighting factor.

6. The transmitter of claim 1 wherein said mapping device includes a convolutional encoder and said equivalence classes are further partitioned into subsets such that the outputs of the convolutional encoder select the subset, and the remaining bits select the equivalence class.

7. A data transfer system for transferring a sequence of octets over a digital network which digital network converts the octets into a sequence of levels for transmission over an analog channel to a receiver, the levels producing an analog signal having a predefined spectral shape, the system comprising:

a transmitter including a digital data collector which collects into data groups the digital data to be transmitted and an encoder, operably coupled to the digital data collector, which encodes each collected group into an octet and transmits each octet over the digital network;

a converter, interconnected with the digital network, for converting the transmitted octets into analog to produce the analog signal for transmission over an analog channel; and a receiver interconnected to the analog channel for transforming the analog signal into the digital data encoded and transmitted by the transmitter;

the encoder including:

a mapping device which receives at its input the collected groups of data bits to be transmitted and outputs for each group an equivalence class of one or more levels, wherein at least one equivalence class contains more than one level;

a level selector, operably coupled to the mapping device, for selecting the level in the equivalence class to represent the group of data bits to be transmitted;

a filter device, operably coupled to the level selector and having a filter response corresponding to the predefined spectral shape, which receives at its input previously selected levels and provides its output to the level selector, wherein the level selector selects the level to be transmitted based on the output of the filter device; and an octet converter, operably coupled to the level selector, which receives the selected level at its input and transmits over the digital network an octet corresponding to the selected level to produce the analog signal having the predefined spectral shape when the transmitted octets are converted to levels in the digital network.

8. The transmitter of claim 7 wherein the levels are nonuniformly spaced.

9. The transmitter of claim 8 wherein the nonuniformly-spaced levels are chosen from the A-law or mu-law specifications.

10. The transmitter of claim 7 wherein the level selector selects the level in the equivalence class which is closest to the output of the filter device.

11. The transmitter of claim 7 wherein the filter device is characterized by the predefined filter response $h(D)=(1-D)/(1-bD)$, where $0<b\leq 1$ is a weighting factor.

12. A transmitter for transmitting a sequence of octets over a digital network which digital network converts the octets into a sequence of levels for transmission over an analog channel to a receiver, the levels producing an analog signal having a spectral null at DC, the transmitter comprising:
- a mapping device which receives at its input groups of data bits to be transmitted and outputs for each group an equivalence class of one or more levels, wherein at least one equivalence class contains more than one level;
- a level selector, operably coupled to the mapping device, for selecting the level in the equivalence class to represent the group of data bits to be transmitted;
- a calculation device, operably coupled to the level selector, for determining a running digital sum of the previously selected levels, wherein the level selector selects the level to be transmitted which causes the running digital sum to most closely approach zero; and
- an octet converter, operably coupled to the level selector, which receives the selected level at its input and transmits over the digital network an octet corresponding to the selected level to produce the analog signal having the DC null when the transmitted octets are converted to levels in the digital network.

13. The transmitter of claim 12 wherein the running digital sum is a weighted running digital sum and the selected level is the level closest in value to the weighted running digital sum.

14. The transmitter of claim 12 wherein the levels are nonuniformly spaced.

15. The transmitter of claim 14 wherein the nonuniformly-spaced levels are chosen from the A-law or mu-law specifications.

16. A method for transmitting a sequence of octets over a digital network which digital network converts the octets into a sequence of levels for transmission over an analog channel to a receiver, the levels producing an analog signal having a predefined spectral shape, the method comprising:
- receiving groups of data bits to be transmitted;
- mapping each group of received data bits into an equivalence class of one or more levels, wherein at least one equivalence class contains more than one level;
- selecting the level in the equivalence class to represent the group of data bits to be transmitted;
- filtering, with a filter device having a filter response, the previously selected levels to produce a filtered output, wherein the filter response corresponds to the predefined spectral shape, and wherein selecting includes selecting the level to be transmitted based on the filtered output; and
- transmitting the octet corresponding to the selected level to produce the analog signal having the predefined spectral shape when the transmitted octets are converted to levels in the digital network.

17. The method of claim 16 wherein the levels are nonuniformly spaced.

18. The method of claim 17 wherein the nonuniformly-spaced levels are chosen from the A-law or mu-law specifications.

19. The method of claim 16 wherein the step of selecting includes selecting the level in the equivalence class which is closest to the filtered output.

20. The method of claim 16 wherein the filter response is characterized by the response $h(D)=(1-D)/(1-bD)$, where $0<b\leq 1$ is a weighting factor.

21. A data transfer method for transferring a sequence of octets over a digital network which digital network converts the octets into a sequence of levels for transmission over an analog channel to a receiver, the levels producing an analog signal having a predefined spectral shape, the method comprising:
- collecting into data groups digital data to be transmitted;
- encoding each collected group into an octet;
- transmitting each octet over the digital network;
- converting the transmitted octets into analog to produce the analog signal for transmission over an analog channel; and
- transforming the analog signal into the digital data which was encoded and transmitted;
- the step of encoding including:
  - mapping each group of data bits into an equivalence class of one or more levels, wherein at least one equivalence class contains more than one level;
  - selecting the level in the equivalence class to represent the group of data bits to be transmitted;
  - filtering, with a filter device, the previously selected levels to produce a filtered output, wherein the filter device has a filter response which corresponds to the predefined spectral shape, and wherein selecting includes selecting the level to be transmitted based on the filtered output;
  - convertering the selected level into an octet corresponding to the selected level; and
  - transmitting the octet to produce the analog signal having the predefined spectral shape when the transmitted octets are converted to levels in the digital network.

22. The method of claim 21 wherein the levels are nonuniformly spaced.

23. The method of claim 22 wherein the nonuniformly-spaced levels are chosen from the A-law or mu-law specifications.

24. The method of claim 21 wherein the step of selecting selects the level in the equivalence class which is closest to the output of the filter device.

25. The method of claim 21 wherein the filter response is characterized by the response $h(D)=(1-D)/(1-bD)$, where $0<b\leq 1$ is a weighting factor.

26. A method for transmitting a sequence of octets over a digital network which digital network converts the octets into a sequence of levels for transmission over an analog channel to a receiver, the levels producing an analog signal having a spectral null at DC, the method comprising:
- receiving groups of data bits to be transmitted;
- mapping each group of data bits into an equivalence class of one or more levels, wherein at least one equivalence class contains more than one level;
- selecting the level in the equivalence class to represent the group of data bits to be transmitted;
- determining a running digital sum of the previously selected levels, wherein selecting includes selecting the level to be transmitted which causes the running digital sum to most closely approach zero; and
- transmiting over the digital network an octet corresponding to the selected level to produce the analog signal having the DC null when the transmitted octets are converted to levels in the digital network.

27. The method of claim 26 wherein determining the running digital sum includes determining a weighted running digital sum and the step selecting includes selecting the level closest in value to the weighted running digital sum.

28. The method of claim 26 wherein the levels are nonuniformly spaced.

29. The method of claim 28 wherein the nonuniformly-spaced levels are chosen from the A-law or mu-law specifications.

30. A computer useable medium having computer readable program code means embodied therein for transmitting a sequence of octets over a digital network which digital network converts the octets into a sequence of levels for transmission over an analog channel to a receiver, the levels producing an analog signal having a predefined spectral shape, comprising:

computer readable program code means for receiving groups of data bits to be transmitted;

computer readable program code means for mapping each group of received data bits into an equivalence class of one or more levels, wherein at least one equivalence class contains more than one level;

computer readable program code means for selecting the level in the equivalence class to represent the group of data bits to be transmitted;

computer readable program code means for filtering, with a filter device having a filter response, the previously selected levels to produce a filtered output, wherein the filter response corresponds to the predefined spectral shape, and wherein the computer readable program code means for selecting includes computer readable program code means for selecting the level to be transmitted based on the filtered output; and computer readable program code means for transmitting the octet corresponding to the selected level to produce the analog signal having the predefined spectral shape when the transmitted octets are converted to levels in the digital network.

31. A computer data signal embodied in a carrier wave, wherein embodied in the computer data signal are computer readable program code means for transmitting a sequence of octets over a digital network which digital network converts the octets into a sequence of levels for transmission over an analog channel to a receiver, the levels producing an analog signal having a predefined spectral shape, comprising:

computer readable program code means for receiving groups of data bits to be transmitted;

computer readable program code means for mapping each group of received data bits into an equivalence class of one or more levels, wherein at least one equivalence class contains more than one level;

computer readable program code means for selecting the level in the equivalence class to represent the group of data bits to be transmitted;

computer readable program code means for filtering, with a filter device having a filter response, the previously selected levels to produce a filtered output, wherein the filter response corresponds to the predefined spectral shape, and wherein computer readable program code means for selecting includes computer readable program code means for selecting the level to be transmitted based on the filtered output; and computer readable program code means for transmitting the octet corresponding to the selected level to produce the analog signal having the predefined spectral shape when the transmitted octets are converted to levels in the digital network.

* * * * *